(12) United States Patent
Spring et al.

(10) Patent No.: US 12,025,826 B2
(45) Date of Patent: Jul. 2, 2024

(54) OPTICAL LIGHT GUIDES AND METHODS OF MANUFACTURING THE SAME

(71) Applicant: ams Sensors Singapore Pte. Ltd., Singapore (SG)

(72) Inventors: Nicola Spring, Wangen (CH); Jens Geiger, Thalwil (CH); Diane Morgan, Zug (CH)

(73) Assignee: ams Sensors Singapore Pte. Ltd., Singapore (SG)

( * ) Notice: Subject to any disclaimer, the term of this patent is extended or adjusted under 35 U.S.C. 154(b) by 306 days.

(21) Appl. No.: 17/273,715

(22) PCT Filed: Sep. 13, 2019

(86) PCT No.: PCT/SG2019/050460
§ 371 (c)(1),
(2) Date: Mar. 4, 2021

(87) PCT Pub. No.: WO2020/060485
PCT Pub. Date: Mar. 26, 2020

(65) Prior Publication Data
US 2022/0113464 A1 Apr. 14, 2022

Related U.S. Application Data

(60) Provisional application No. 62/732,291, filed on Sep. 17, 2018.

(51) Int. Cl.
*G02B 6/12* (2006.01)
*B29D 11/00* (2006.01)
*F21V 8/00* (2006.01)

(52) U.S. Cl.
CPC ...... *G02B 6/0065* (2013.01); *B29D 11/00307* (2013.01); *B29D 11/00692* (2013.01);
(Continued)

(58) Field of Classification Search
CPC .. G02B 6/0065; G02B 6/12; B29D 11/00307; B29D 11/00692
See application file for complete search history.

(56) References Cited

U.S. PATENT DOCUMENTS

2003/0020189 A1   1/2003   Chen
2010/0014165 A1   1/2010   Louh
(Continued)

FOREIGN PATENT DOCUMENTS

CN   1740830 A   3/2006
CN   1836179 A   9/2006
(Continued)

OTHER PUBLICATIONS

International Patent Application No. PCT/SG2019/050460, "International Search Report", dated May 8, 2020, 7 pages.
(Continued)

*Primary Examiner* — Mathieu D Vargot
(74) *Attorney, Agent, or Firm* — Viering, Jentschura & Partner mbB; Robert M Bilotta, Jr.

(57) ABSTRACT

Fabricating light guide elements includes forming a first portion of the light guide element using a replication technique (104), and forming a second portion of the light guide element using a photolithographic technique (106). Use of replication can facilitate formation of more complex-shaped optical elements as part of the light guide element. The replication process sometimes results in the formation of a "yard," or excess replication material, which may lead to light leakage if not removed or smoothed over. In some instances, at least part of the yard portion is embedded within the second portion of the light guide element, thereby resulting in a smoothing over of the yard portion.

17 Claims, 5 Drawing Sheets

(52) U.S. Cl.
CPC ...... *G02B 6/12* (2013.01); *G02B 2006/12102* (2013.01); *G02B 2006/12107* (2013.01); *G02B 2006/12114* (2013.01)

(56) References Cited

U.S. PATENT DOCUMENTS

| | | | |
|---|---|---|---|
| 2010/0142896 A1* | 6/2010 | Riester | G02B 6/138 |
| | | | 29/829 |
| 2012/0033912 A1 | 2/2012 | Maxwell et al. | |
| 2013/0286686 A1 | 10/2013 | Kettunen et al. | |
| 2014/0295122 A1 | 10/2014 | Reil et al. | |
| 2015/0351841 A1* | 12/2015 | Whiteside | G02B 6/4206 |
| | | | 600/407 |
| 2017/0077162 A1 | 3/2017 | Rossi et al. | |
| 2017/0309685 A1 | 10/2017 | Heimgartner et al. | |

FOREIGN PATENT DOCUMENTS

| | | | |
|---|---|---|---|
| CN | 101630123 A | | 1/2010 |
| CN | 201583683 | * | 9/2010 |
| CN | 104570210 A | | 4/2015 |
| WO | 2020060485 A2 | | 3/2020 |

OTHER PUBLICATIONS

International Patent Application No. PCT/SG2019/050460, "Written Opinion", dated May 8, 2020, 10 pages.
Chinese office action issued for the corresponding Chinese patent application No. 20198000607852, dated Aug. 24, 2022, 6 pages (for informational purposes only).

* cited by examiner

OPTICAL LIGHT GUIDES AND METHODS OF MANUFACTURING THE SAME

CROSS-REFERENCE TO RELATED APPLICATIONS

This application is a 371 U.S. National Phase of PCT International Patent Application No. PCT/SG2019/050460, filed on Sep. 13, 2019, which claims benefit and priority to U.S. provisional patent application No. 62/732,291, filed on Sep. 17, 2018; the disclosures of which are each incorporated by reference herein in their entirety for all purposes.

FIELD OF THE DISCLOSURE

This disclosure relates to optical light guides.

BACKGROUND

Miniaturized optical light guide elements are sometimes integrated, for example, into electronic devices such as smart phones and other portable computing devices. In some cases, known techniques of fabricating the light guides result in residual layers or undefined edges, which can cause light leakage and, thus, reduce optical efficiency of the light guide.

SUMMARY

The present disclosure describes techniques for fabricating light guide elements. A first portion of a light guide element is formed using a replication technique, whereas a second portion of the light guide element is formed using a photolithographic technique.

Use of replication can facilitate formation of more complex-shaped optical elements as part of the light guide element. However, the replication process sometimes results in the formation of a "yard," or excess replication material, which may lead to light leakage if not removed or smoothed over. In some cases, at least part of the yard portion is embedded within the second portion of the light guide element. For example, the second portion can encase at least part of the yard portion, thereby resulting in a smoothing over of the yard portion.

In some implementations, for example, the first replicated portion has a wedge shape. In some instances, the first replicated portion defines at least one of a prism, a lens or an optical grating. The second portion can have, for example, a rectangular cross-section transverse to a main direction of light propagation in the light guide element. The second portion can be composed of a material different from that of the first portion and can be index-matched to the material of the first portion.

In some implementations, the light guide element includes a carrier over which the first and second portions are disposed, wherein the carrier includes one or more undercuts containing replication material. The undercuts can, in some cases, allow the transition from the light guiding path to the yard to be placed at, or even slightly below, the surface of the carrier, which can improve the path along which the light travels through the light guide element.

In some cases, the light guide element includes a cladding disposed over the carrier and below the first and second portions. For example, if the carrier does not have a sufficiently low index of refraction, a low index epoxy or other suitable cladding material can be provided on the surface of the carrier.

The techniques can be part of a waver-level process in which multiple (e.g., hundreds or even thousands) light guide elements are fabricated in parallel at the same time.

Other aspects, features and advantages will be readily apparent form the following detailed description, the accompanying drawings, and the claims.

DETAILED DESCRIPTION

The present disclosure describes wafer-level techniques that can be used to fabricate multiple (e.g., hundreds or thousands) light guide elements simultaneously in parallel. The techniques also can be used to fabricate a smaller number of light guide elements. As described in greater detail below, a first portion of each light guide element is formed using a replication technique, whereas a second portion of each optical light guide element is formed using a photolithographic technique. For example, one end of each light guide element (e.g., the light entrance area or light exit area) can be formed by replication, whereas the main body of each light guide element can be formed by a photolithographic technique. In some instances, the portion of the light guide element formed by replication has a wedge shape and has an inclined surface with respect to a main direction of light propagation through the light guide. In some cases, the portion of the light guide element formed by replication defines a prism, a lens (e.g., diffractive or refractive), an optical (e.g., diffractive) grating, or some other optical element. The portion formed by replication and the portion formed by photolithography are integrated and coupled optically together so as to form a unitary light guide element. Forming the light guide elements in this manner can, in some cases, help reduce light leakage and improve optical efficiency.

Figure 1:
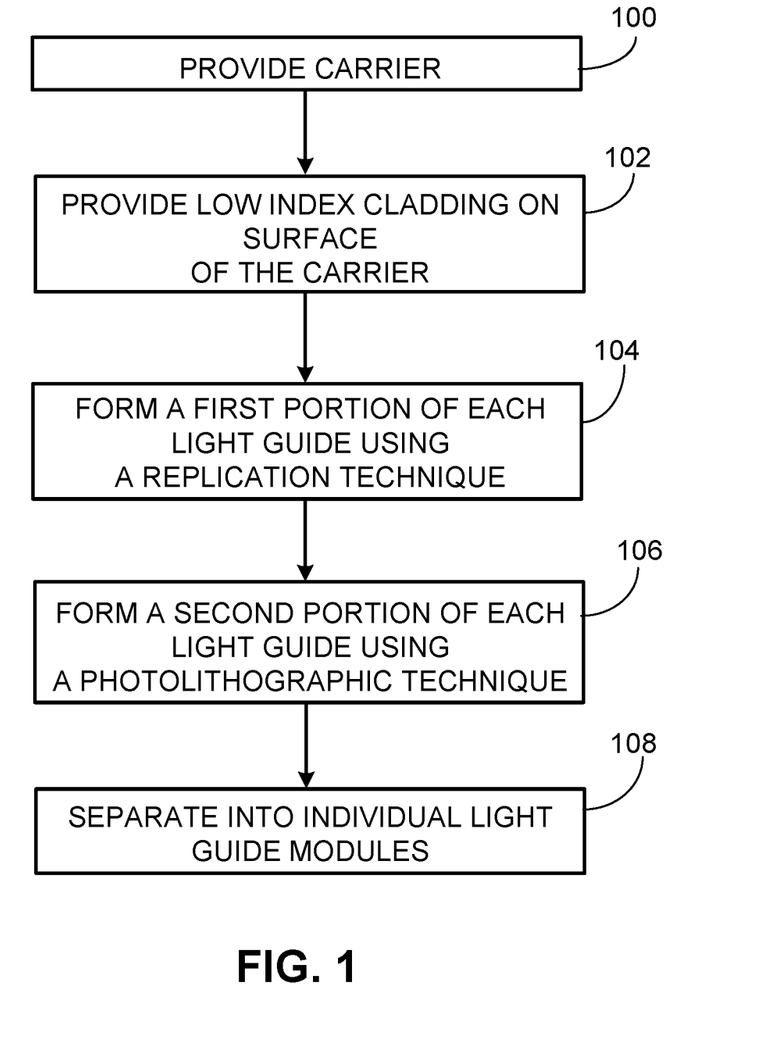
FIG. 1 is a flow chart illustrating an example of a wafer-level process of fabricating light guide elements.

FIG. 1 provides an overview of a wafer-level process for making such light guide elements. As indicated by FIG. 1, a carrier is provided for the light guide elements (100). The carrier can be, for example, a glass wafer or other substrate. In some implementations, the carrier is composed of a polymer or a semiconductor material (e.g., silicon). The surface of the carrier on which the light guide elements are to be formed may be substantially flat, although in some cases the surface may be structured. For example, the surface of the carrier may include grooves or other mechanical structures. The grooves, if present, can facilitate removal of excess replication material used to form part of the light guide elements.

In some implementations, prior to formation of the light guide elements, one or more layers are provided on the carrier so to modify the optical properties at the carrier's contact surface. For example, if the carrier does not have a sufficiently low index of refraction, a low index epoxy or other suitable cladding material can be provided (e.g., by spin coating) on the surface of the carrier (102). Alternatively, in some instances, a highly reflective layer is provided on the carrier's surface.

Next, the various portions of the light guide elements are formed, respectively, by replication and photolithography (104 and 106). Although the following example describes formation of the replicated portions before formation of the photolithographic portions, in other instances, the replicated portions are formed after formation of the photolithographic portions.

Figure 2:
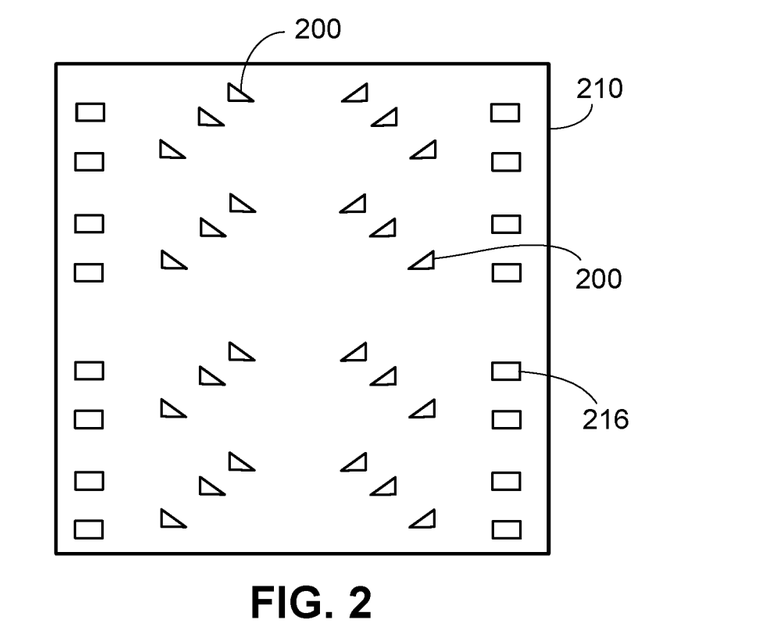
FIG. 2 illustrates an example of a carrier after formation of replicated portions of the light guide elements.

As illustrated in FIG. 2, first portions 200 of the light guide elements are formed by a replication technique. In general, replication refers to a technique by means of which a given structure or a negative thereof is reproduced (e.g., by etching, embossing or molding). In a particular example of a replication process, a structured surface is embossed into a liquid, viscous or plastically deformable material, and the material is hardened, e.g., by curing using ultraviolet radiation or heating, and then the structured surface is removed. Thus, a replica (which in this case is a negative replica) of the structured surface is obtained. Suitable materials for replication include, for example, hardenable (e.g., curable) polymer materials which are transformable in a hardening step (e.g., a curing step) from a liquid, viscous or plastically deformable state into a solid state.

The replication process can involve using a single replication tool that has structures to replicate the first portions 200 of the light guide elements. In particular, the first portions 200 can be replicated directly onto the carrier 210 using the same replication tool. The first portions 200 can be replicated, for example, by providing a replication material on replication sections of the replication tool. The carrier 210 then is brought into contact with the replication sections of the replication tool. This causes replication material to be pressed between the areas defining the replication sections and the surface of the carrier 210. The replication sections of the tool are thereby embossed on the replication material, which then can be hardened by UV and/or thermal curing.

In the illustrated example, the replicated portions 200 of the light guide elements are wedge shaped and have an inclined surface (e.g., a 45° or other angle) with respect to a main direction 206 of light propagation through the finished light guide. See FIG. 5. The top, horizontal surface of the replicated, wedge shaped portion 200 can be used to define the thickness of the light guide, including the thickness of the subsequently formed second portion. The replication process may facilitate formation of more complex structures than might otherwise be possible using other techniques. Thus, in some cases, the replicated portion 200 of the light guide element can have a different shape and can define, for example, a prism, a lens (e.g., diffractive or refractive), an optical (e.g., diffractive) grating, or some other optical element.

Figure 5:
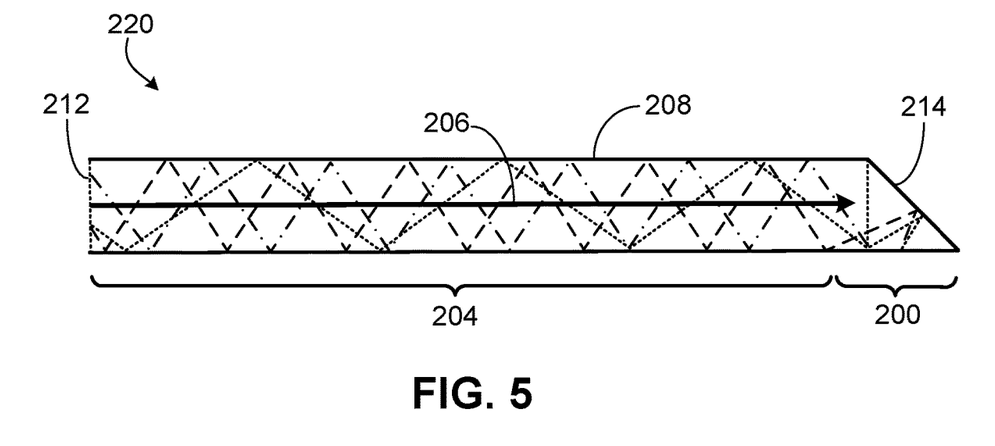
FIG. 5 illustrates an example of a light guide element.

The second portion 204 of each light guide element is formed by a photolithographic process. In the example of FIG. 5, the second portion 204 of each light guide element has a rectangular cross-section transverse to the main direction 206 of light propagation in the light guide. In the illustrated example, the top surface of the second portion 204 is substantially flat and parallel to the surface of the carrier. Further, the second portion 204 is provided so as to form, together with the first portion 200, a single unitary light guide element that allows light to propagate from one end 212 of the light guide element to the other end 214. One end of the light guide element may be a light entrance end; the other end may be a light exit end.

Figure 3:
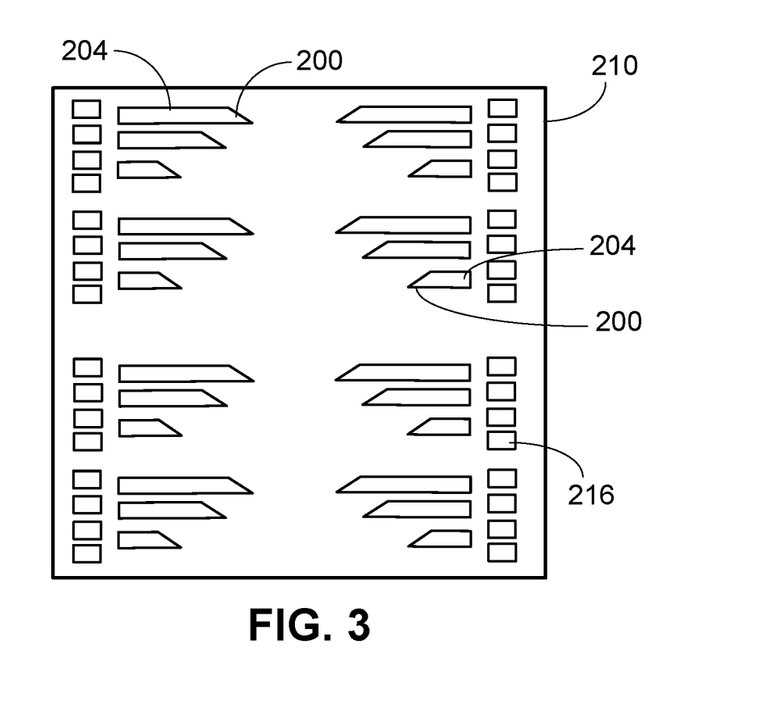
FIG. 3 illustrates an example of a carrier after formation of photolithographic portions of the light guide elements.

To form the second portions 204 of the light guide elements, a layer of photostructurable material is applied (e.g., dispensed) over the carrier 210. For example, the carrier 210 can be coated with a light-sensitive polymer or other organic material (e.g., a photoresist). The polymer layer then is patterned to create the second portions 204 of the light guide elements. One advantage of polymer light guides is that the chemistry of the light guide can be varied to control desired properties such as refractive index, thermal response, or dopant levels.

After applying the photostructurable material on the carrier, a patterned mask is applied to the surface of the polymer material to block light, so that only unmasked regions of the material are exposed to light. The mask defines the second portions 204 of the light guide elements. A solvent, sometimes referred to as a developer, is applied to the surface. In some cases, the photo-sensitive material is degraded by light and the developer dissolves away the regions that were exposed to light, leaving behind the photosensitive material where the mask was placed as the second portions 204. In other cases, the photosensitive material is strengthened (e.g., polymerized or cross-linked) by the light, and the developer dissolves away only the regions that were not exposed to light, leaving behind the photosensitive material where the mask was not placed as the second portions 204.

The replication process sometimes results in the formation of a "yard," or excess replication material. The excess material may lead to light leakage if not removed or smoothed over. An example is illustrated in connection with FIG. 6A, which shows a replicated structure than includes the replicated first portion 200 of a light guide element, as well as yard or edge portions 201A, 201B that may be formed as a result of the replication process. In some cases, as illustrated in FIG. 6B, at least part of the yard portion 201A is embedded within the second portion 204 of the light guide element. Formation of the second portion 204 by photolithography can encase the yard or edge portion 201A, which results in a smoothing over of the yard or edge portion 201A. Thus, even though the materials for the replicated structure and the portion formed by photolithography may be different, it can be advantageous for the portion of the light guide formed by photolithography to be index-matched to the replicated structure. Further, in some cases, some or all of the excess material of the yard portion (e.g., the yard portion 201B) may be removed, for example, by laser ablation (see FIG. 6C). Also, as noted above, the top, horizontal surface 209 of the replicated, wedge shaped portion 200 can be used to define the thickness of the light guide, including the thickness of the subsequently formed second portion 204. The top, horizontal surface 209 thus can serve as a spacer to form the light guide in the exact height of the prism 200.

In some implementations, the material of the second portion 204 of each light guide element is selected so that light of a particular wavelength (or within a particular wavelength range) travels in the light guide element by total internal reflection (TIR). In such cases, a material having a relatively high-index of refraction may be desirable. In the present context, "light" can include not only visible radiation, but may include infra-red (IR), near-IR and/or ultra-violet (UV) light.

In other instances, a core material for the second portion 204 may be coated with a high reflective material. In yet other cases, a high refractive index material is used for the core of the second portion 204, which is surrounded by a coating having a low index of refraction so as to encapsulate and protect the core, for example, from humidity.

Figure 6A:
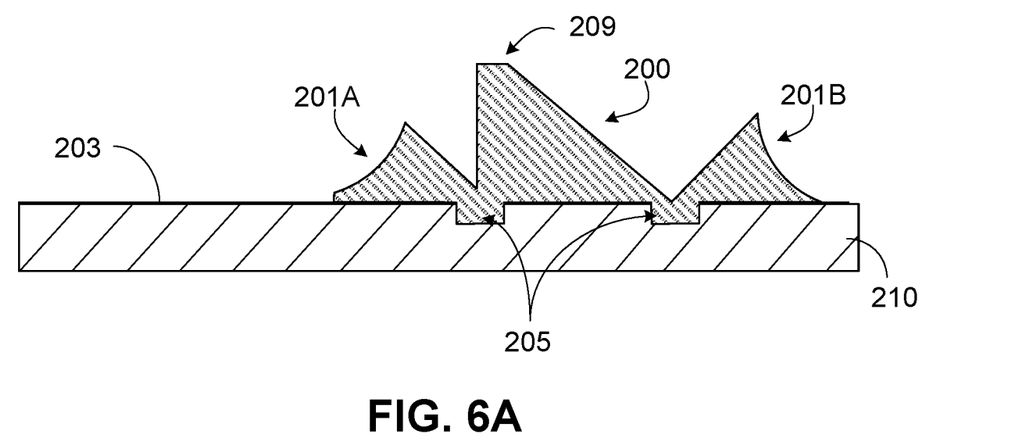
FIG. 6A illustrates an example of a replicated structure for a light guide element.
Figure 6B:
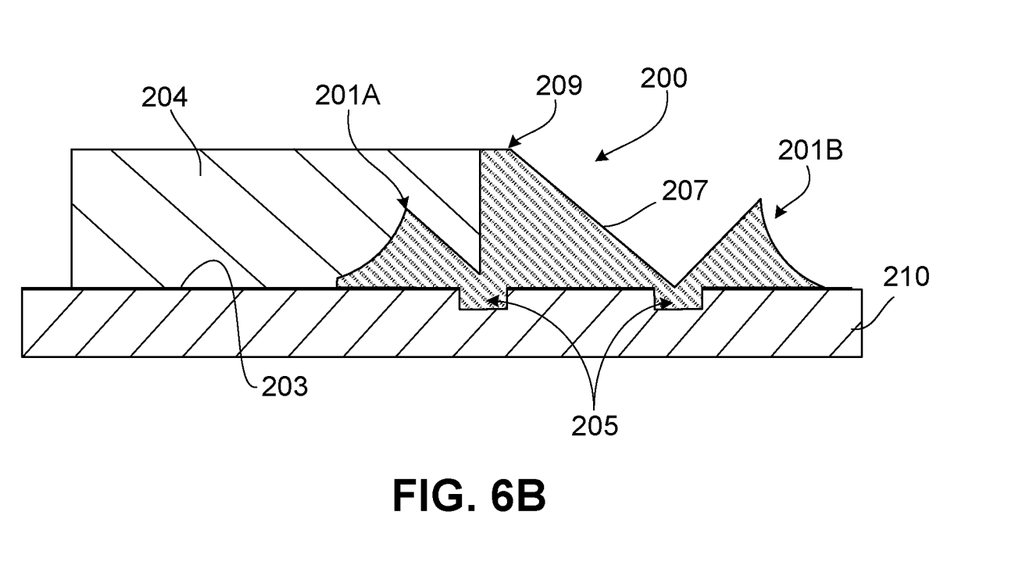
FIG. 6B illustrates an example of the light guide element after formation of the photolithographic portion.
Figure 6C:
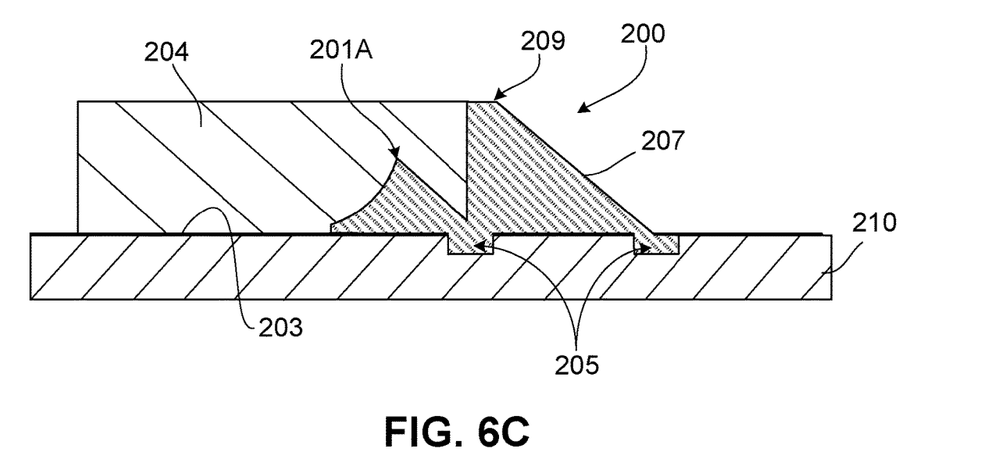
FIG. 6C illustrates an example of the light guide element after removal of a yard portion of the replicated structure.

FIGS. 6A and 6B illustrate an example of a low index epoxy or other suitable cladding material 203 on the surface of the carrier 210. Also, in some cases, the carrier 210 can include one or more undercuts 205 to move transition points of the yard 201A, 201B of replicated material below the optical path so to reduce light leakage and efficiency loss that may result from light that would be out-coupled through the surrounding structures. The undercuts 205 allow the transition from the light guiding path to the yard to be placed at, or even slightly below, the surface of the carrier 210. As most of the light is guided under flat angles inside the light guide, the light will be reflected on the slanted wedge surface 207 instead of transmitted further through the yard.

Figure 4:
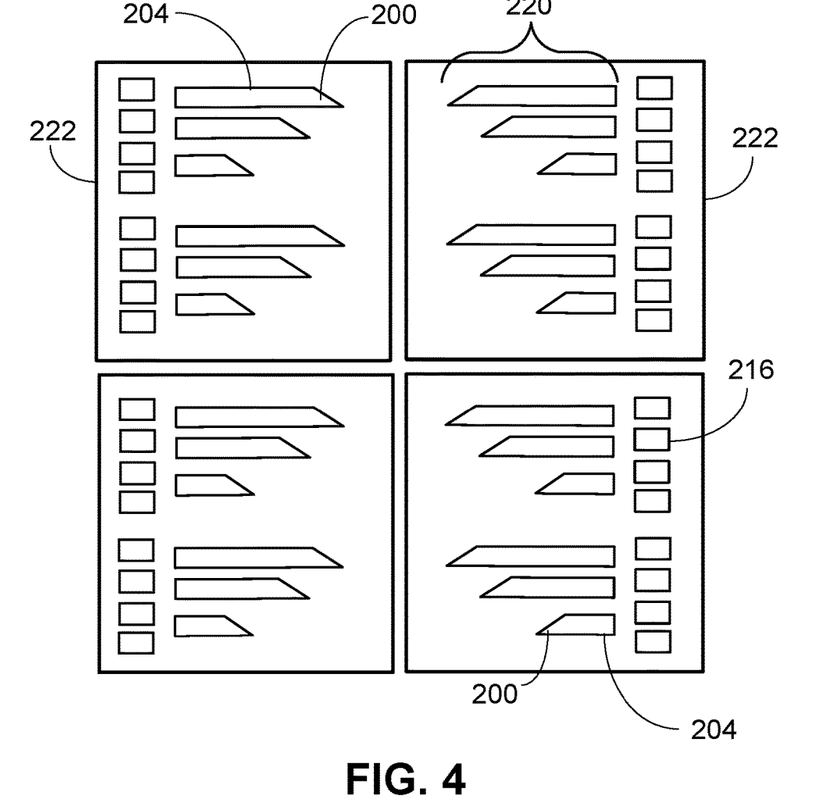
FIG. 4 illustrates the carrier after dicing.

In some implementations, as illustrated in FIG. 4, the foregoing replication process and/or the photolithographic process can be used to form additional structures 216 on the carrier.

Following formation of the light guide elements, the carrier 210 can be separated (108) into individual light guide modules 222, each of which includes one or more light guide elements 220 (see FIG. 4). The carrier 210 can be separated, for example, by dicing.

A light guide element 220 as described above can be integrated, for example, into a host device such as a portable computing devices (e.g., a multi-function smart phone, a digital media player, a digital camera a personal digital assistant (PDA), a laptop computer, a tablet, or a navigation device). Such devices sometimes include a display screen that can be used under various lighting environments. The device may have integrated in it a function that provides (in real-time) an indication of the current level of visible light in the immediate environment outside the device (e.g., an ambient light sensor function (or ALS). The ALS can be used for applications such as automatically managing the brightness of a display screen for better readability or for saving battery energy (depending upon the current ambient light level).

Figure 7:
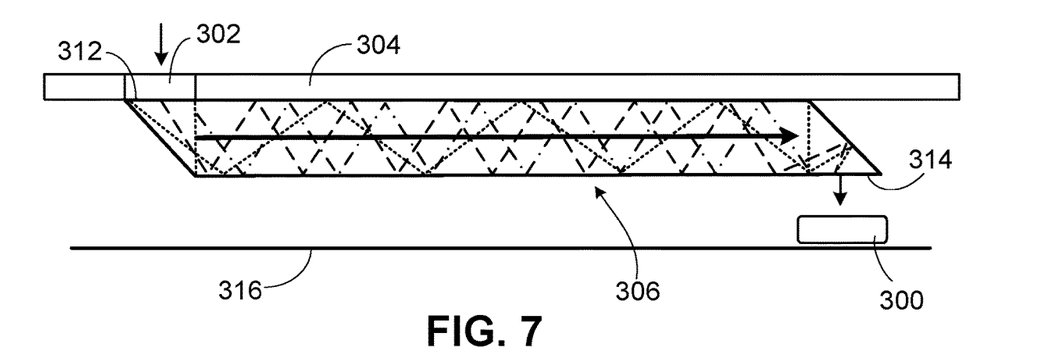
FIG. 7 illustrates an example of a host device in which a light guide element is integrated.

In some cases, the light sensor is disposed directly under a light-transparent window in the cover of the host device. The incoming light therefore directly impinges on the light sensor. However, as shown in FIG. 7, in some instances, the sensor 300 may not be arranged in line with the light-transparent window 302 in the cover 304 of the host device, but rather arranged laterally displaced from the light-transparent window. In such situations, light that enters through the light-transparent window 302 has to be guided to the light sensitive surface area of the light sensor 300. A light guide element 306 as described above can be provided to guide the incoming light to the sensor. Incoming light can travel along the light guide element, for example, by total internal reflection (TIR). In some applications, a light entrance area 312 of the light guide element 306 faces the light-transparent window 302 in the transparent cover 304 arranged above the light guide element 306. A light exit area 314 can face the light sensor 300 arranged below the light guide element 306. In some implementations, a portion of the light guide element 306, including at least the light entrance area 312 or the light exit area 314, is formed by a replication process, whereas the rest of the light guide element 306 is formed by a photolithographic process. The light sensor can be mounted, for example, in or on a circuit board that includes other electronics 316.

Light guide elements described above also can be integrated, for example, as part of a planar light guide circuit (PLC) which can integrate multiple optical functions on a single substrate. The light guide elements can be useful, for example, in light detection and ranging (LIDAR) as well as other applications.

Various modifications can be made to the foregoing examples. Accordingly, other implementations are within the scope of the claims.

What is claimed is:

1. A method of manufacturing a light guide element, the method comprising:
   forming a first portion of the light guide element by a replication process; and
   forming a second portion of the light guide element by a photolithographic process;
   wherein the replication process results in a replicated structure that includes a yard portion, and wherein the photolithographic process results in a smoothing over of at least part of the yard portion.

2. The method of claim 1 wherein the light guide element is formed as part of a wafer-level process in which a plurality of light guide elements are formed simultaneously.

3. The method of claim 1 including forming the first and second portions on a carrier.

4. The method of claim 1 wherein the first portion defines a light entrance or light exit region of the light guide element.

5. The method of claim 1 wherein the first portion has a wedge shape.

6. The method of claim 1 wherein the first portion defines one of:
   an optical element;
   a prism;
   a lens; or
   an optical grating.

7. The method of claim 1 wherein the second portion has a rectangular cross-section transverse to a main direction of light propagation in the light guide element.

8. The method of claim 1 wherein forming the second portion of the light guide element includes applying a photostructurable material to a carrier.

9. The method of claim 1 wherein forming the first portion of the light guide element includes:
   providing a replication material on a replication section of a replication tool;
   bringing a carrier into contact with the replication section of the replication tool so as to press the replication material between an area defining the replication section and a surface of the carrier; and
   causing the replication material to be hardened.

10. The method of claim 1 including removing at least a part of the yard portion by laser ablation.

11. A light guide element comprising:
    a first replicated light guide portion; and
    a second photolithographically formed light guide portion;
    wherein the first replicated light guide portion includes a yard portion, and wherein the photolithographically formed light guide portion smooths over at least part of the yard portion.

12. The light guide element of claim 11 wherein the first replicated light guide portion has a wedge shape.

13. The light guide element of claim 11 wherein the first replicated light guide portion defines at least one of a prism, a lens or an optical grating.

14. The light guide element of claim 11 wherein the second light guide portion has a rectangular cross-section transverse to a main direction of light propagation in the light guide element.

15. The light guide element of claim 11 wherein the second light guide portion is composed of a material different from that of the first light guide portion, and wherein the material of the second light guide portion is index-matched to the material of the first light guide portion.

16. The light guide element of claim 11 including a carrier over which the first and second light guide portions are disposed, wherein the carrier includes one or more undercuts containing replication material.

17. The light guide element of claim 11 including a carrier over which the first and second portions are disposed, and further including a cladding disposed over the carrier and below the first and second light guide portions.

* * * * *